(12) United States Patent
Gibbins et al.

(10) Patent No.: US 10,750,059 B2
(45) Date of Patent: Aug. 18, 2020

(54) APPARATUS AND METHOD FOR MONITORING PERFORMANCE CHARACTERISTICS OF A COMPONENT OF A VEHICLE

(71) Applicant: The Boeing Company, Chicago, IL (US)

(72) Inventors: Martin N. Gibbins, Carnation, WA (US); Gregory D. Miller, Seattle, WA (US); Paul H. Lai, Arcadia, CA (US); James G. Scoby, Long Beach, CA (US); Gregory E. Rupert, Rossmoor, CA (US); Chetan T. Katakia, Downey, CA (US); David B. Moore, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 340 days.

(21) Appl. No.: 15/896,540

(22) Filed: Feb. 14, 2018

(65) Prior Publication Data

US 2018/0183980 A1  Jun. 28, 2018

Related U.S. Application Data

(62) Division of application No. 14/263,017, filed on Apr. 28, 2014, now Pat. No. 9,930,226.

(51) Int. Cl.
*G07C 5/08* (2006.01)
*G03B 17/56* (2006.01)
(Continued)

(52) U.S. Cl.
CPC ......... *H04N 5/2252* (2013.01); *G07C 5/0866* (2013.01); *G03B 15/00* (2013.01);
(Continued)

(58) Field of Classification Search
CPC .... H04N 5/2252; H04N 7/183; G07C 5/0866; G03B 17/56; G03B 15/00; G03B 15/006; G03B 17/561
See application file for complete search history.

(56) References Cited

U.S. PATENT DOCUMENTS

| 5,283,643 | A | * | 2/1994 | Fujimoto | ............... | B64D 45/00 |
| | | | | | | 340/973 |
| 7,324,747 | B2 | * | 1/2008 | Kempas | ................... | B64C 1/36 |
| | | | | | | 244/129.1 |

(Continued)

OTHER PUBLICATIONS

Bjoring, D.; "Air Force Use of Aerial Cameras for Instrumentation", Aug. 1, 1967, Proceedings of SPIE (Year: 1967).*

*Primary Examiner* — Herbert K Roberts
*Assistant Examiner* — John M Royston
(74) *Attorney, Agent, or Firm* — Walters & Wasylyna LLC

(57) ABSTRACT

An apparatus for monitoring at least one performance characteristic of a component of a vehicle may include a tripod connected to an exterior surface of the vehicle, the tripod includes a plurality of airfoils defining an aerodynamic surface of the tripod, a camera positioned on the tripod at a predetermined viewing angle directed toward the component of the vehicle and a camera fairing connected to the tripod and surrounding the camera, the camera fairing includes a sidewall defining an aerodynamic surface of the camera fairing, an aperture disposed through the sidewall and aligned with the camera and a plurality of protrusions positioned proximate the aperture.

20 Claims, 11 Drawing Sheets

(51) Int. Cl.
*H04N 7/18* (2006.01)
*G03B 15/00* (2006.01)
*H04N 5/225* (2006.01)

(52) U.S. Cl.
CPC ............ *G03B 15/006* (2013.01); *G03B 17/56* (2013.01); *G03B 17/561* (2013.01); *H04N 7/183* (2013.01)

(56) References Cited

U.S. PATENT DOCUMENTS

2008/0267613 A1* 10/2008 Darrow ................ F16M 11/041
396/428
2008/0304705 A1* 12/2008 Pomerleau ................ B60R 1/00
382/103

* cited by examiner

APPARATUS AND METHOD FOR MONITORING PERFORMANCE CHARACTERISTICS OF A COMPONENT OF A VEHICLE

PRIORITY

This application is a divisional of U.S. Ser. No. 14/263,017 filed on Apr. 28, 2014.

FIELD

The present disclosure is generally related to monitoring performance of a vehicle and, more particularly, to an apparatus and method for visually monitoring one or more performance characteristics of a component of a vehicle, such as a wing assembly of an aircraft.

BACKGROUND

Performance testing of a vehicle is common prior to placing the vehicle into use, for example, in the aerospace industry. For example, performance characteristics of components (e.g., wing assemblies) of an aircraft need to be observed and/or recorded during flight.

Various methods are employed to monitor inflight performance characteristics. For example, a camera may be mounted inside the cabin or in the tail of the aircraft to record performance of a wing test in flight conditions. However, interior cameras often fail to provide optimum viewing angles of the desired component. As another example, to record performance of a wing test in flight conditions, a chase aircraft may carry a camera. However, cameras mounted on chase aircraft lack image stability and/or suitable image resolution. A camera mounted externally on the aircraft and displaced from tested component may provide suitable viewing angles, but experience airflow-induced vibrations that degrade resulting image quality.

Accordingly, those skilled in the art continue with research and development efforts in the field of monitoring and/or recording performance characteristics of a vehicle, such an aircraft in flight conditions.

SUMMARY

In one embodiment, the disclosed apparatus for monitoring at least one performance characteristic of a component of a vehicle may include a camera fairing defining an internal volume, the camera fairing may include a sidewall including an aerodynamic surface and an aperture disposed through the sidewall, wherein the aerodynamic surface includes a plurality of protrusions positioned proximate the aperture.

In another embodiment, the disclosed apparatus for monitoring at least one performance characteristic of a component of a vehicle may include a tripod including an aerodynamic surface, the tripod may include a first leg directed toward a forward end of the vehicle, a second leg directed toward an aft end of the vehicle, and a third leg directed toward the aft end of the vehicle, wherein each of the first leg, the second leg and the third leg are disposed at a non-zero sweep angle with respect to a plane normal to a streamline direction, wherein the third leg is offset with respect to the second leg, and wherein the second leg and the third leg are disposed at a non-zero splay angle with respect to one another.

In another embodiment, the disclosed apparatus for monitoring at least one performance characteristic of a wing assembly of an aircraft may include a tripod connected to an exterior surface of an aircraft, the tripod includes a plurality of airfoils defining an aerodynamic surface of the tripod, a camera positioned on the tripod at a predetermined viewing angle directed toward a wing assembly of the aircraft and a camera fairing connected to the tripod and surrounding the camera, the camera fairing includes a sidewall defining an aerodynamic surface of the camera fairing, an aperture disposed through the sidewall and aligned with the camera and a plurality of protrusions positioned proximate the aperture.

In yet another embodiment, also disclosed is a method for monitoring at least one performance characteristic of a wing assembly of an aircraft, the method may include the steps of: (1) connecting a tripod to an exterior surface of the aircraft, the tripod including a plurality of airfoils defining an aerodynamic surface of the tripod, (2) positioning a camera on the tripod at a predetermined viewing angle directed toward the wing assembly, (3) connecting a camera fairing to the tripod surrounding the camera, the camera fairing including a sidewall defining an aerodynamic surface of the camera fairing, an aperture disposed through the sidewall and aligned with the camera and a plurality of protrusions positioned proximate the aperture and recording at least one performance characteristic of the wing assembly during flight.

Other embodiments of the disclosed apparatus will become apparent from the following detailed description, the accompanying drawings and the appended claims.

DETAILED DESCRIPTION

Figure 1:
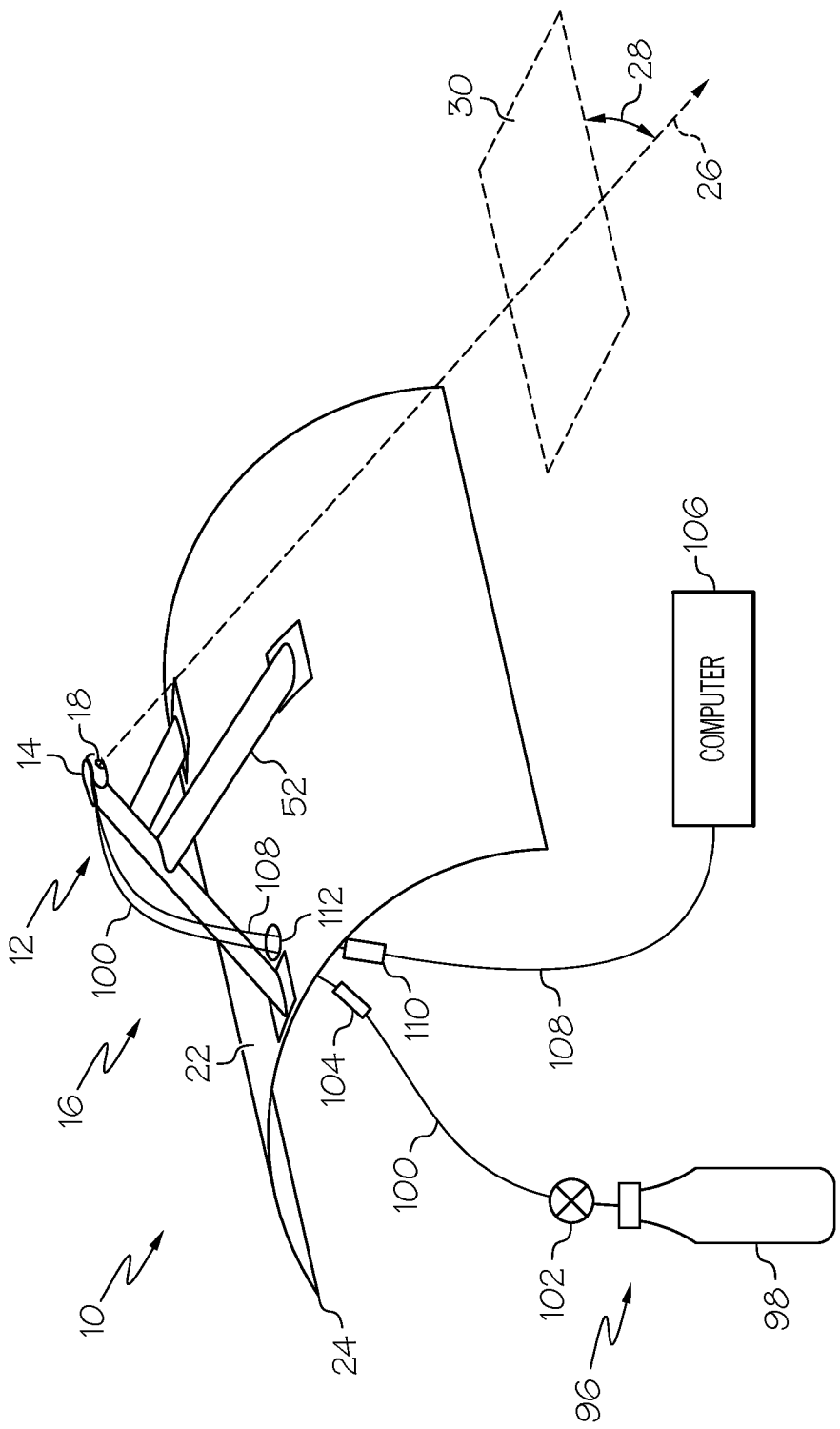
FIG. 1 is a schematic illustration of the disclosed apparatus for monitoring at least one performance characteristic of a component of a vehicle.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, the disclosed apparatus, generally designated 10, for monitoring at least one performance characteristic and/or feature of a component (e.g., a wing assembly) of a vehicle (e.g., an aircraft) may include a tripod assembly 12, a camera fairing 14, and an imaging system 16. The imaging system 16 may include a camera 18.

The apparatus 10 may monitor (e.g., visually observe and/or record) one or more performance characteristics and/or features of a component 20 of a vehicle 24. For example, the apparatus 10 may monitor operational performance characteristics of the vehicle 24 including, but not limited to, structural deflection, ice accumulation, thermal characteristics of airflow, thermal characteristics of the component 20 (e.g., the wing assembly) or the like. The camera 18 may include video camera or a still photograph camera. The camera 18 may obtain videos or images in the visible spectrum or the infrared spectrum.

The tripod assembly 12 may be connected to an exterior surface 22 of the vehicle 24. The camera fairing 14 may be connected to the tripod assembly 12. The camera 18 may be positioned within the camera fairing 14. The tripod assembly 12 may support the camera 18 at a predetermined position such that a line of sight 26 of the camera 18 includes a viewing angle 28 with respect to a reference plane 30. In the example illustrated in FIG. 1, the reference plane 30 may be substantially horizontal; however, those skilled in the art will appreciate that the reference plane 30 may have any orientation depending upon the component 20 being monitored.

Figure 2:
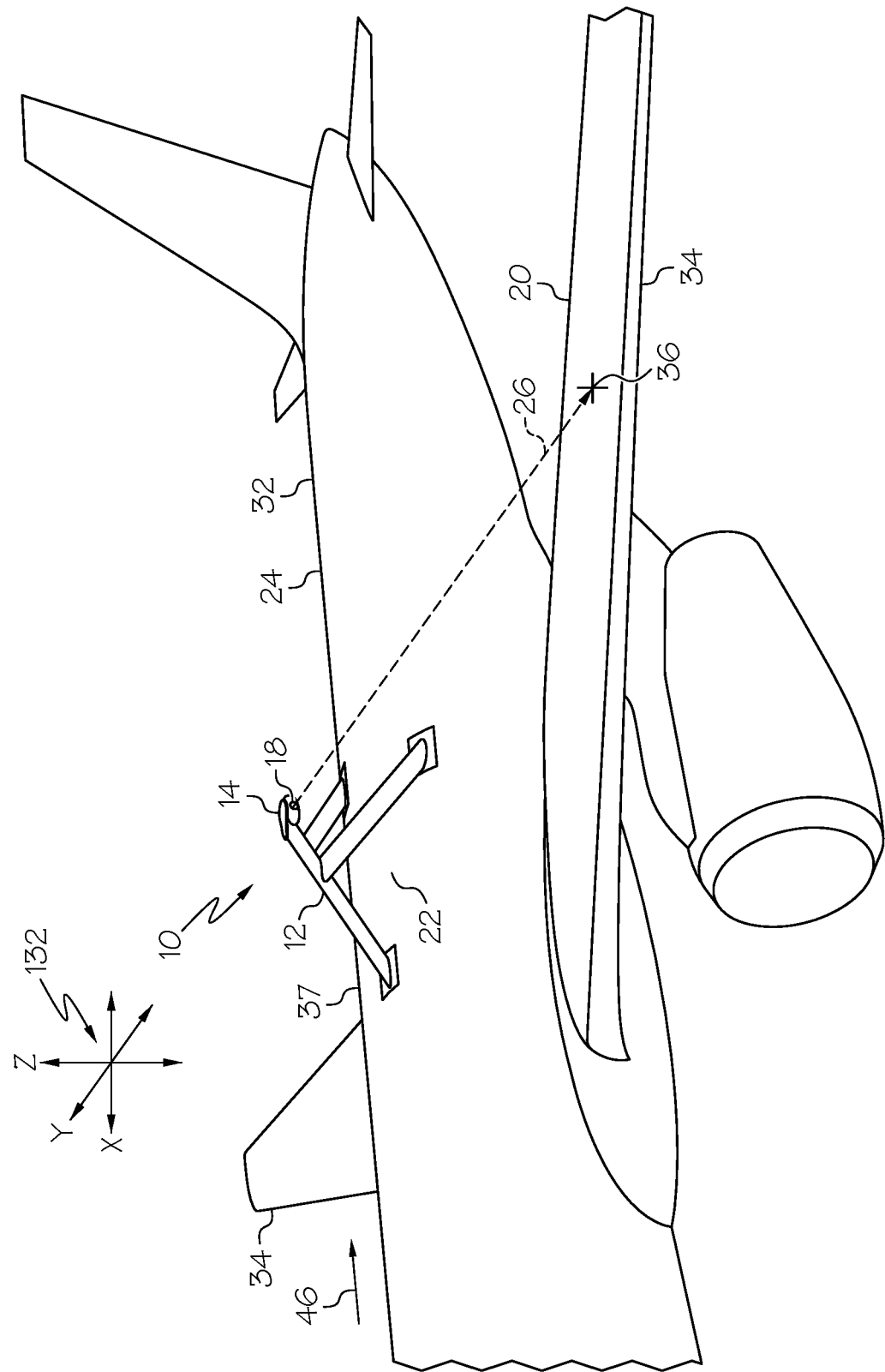
FIG. 2 is a schematic illustration of one implementation of the disclosed apparatus.

Referring briefly to FIGS. 1 and 2, as one example, the viewing angle 28 and/or the reference plane 30 (FIG. 1) may be defined with respect to a body coordinate system 132 of the vehicle 24 (FIG. 2). For example, the body coordinate system 132 may include an X-axis parallel to a longitudinal axis of the vehicle 24 (e.g., an aircraft 32) and a Y-axis normal to the X-axis (e.g., generally parallel to the wing assemblies 34 of the aircraft 32). The horizontal reference plane 30 may be generally parallel to an X-Y plane defined by the X-axis and the Y-axis. A Z-axis may be normal to the X-Y plane.

Referring again to FIG. 1, the viewing angle 28 may be a zero angle or a non-zero angle. For example, the viewing angle 28 may be approximately 0 degrees. As another example, the viewing angle 28 may be between approximately 1 degree and 90 degrees. As another example, the viewing angle 28 may be between approximately 5 degrees and 60 degrees. As another example, the viewing angle 28 may be between approximately 15 degrees and 45 degrees. As another example, the viewing angle 28 may be approximately 16.8 degrees. As yet another example, the viewing angle 28 may be approximately 7 degrees.

Referring to FIG. 2, in an example implementation, the vehicle 24 may be the aircraft 32 and the component 20 may be the wing assembly 34 of the aircraft 32. For example, the apparatus 10 may monitor inflight performance or simulated inflight performance (e.g., wind tunnel) of the wing assembly 34.

In an example construction, the tripod assembly 12 may be connected to the exterior surface 22 of the aircraft 32. For example, the tripod assembly 12 may be connected to an exterior surface 22 (e.g., an upper surface) of a fuselage 37 of the aircraft 32 approximately between the wing assemblies 34. The line of sight 26 of the camera 18 may be directed toward an area of interest 36 (e.g., an upwardly facing surface) of the wing assembly 34. For example, reference plane 30 (FIG. 1) may be at least partially co-planar with the upwardly facing surface of the wing assembly 34.

Figure 3:
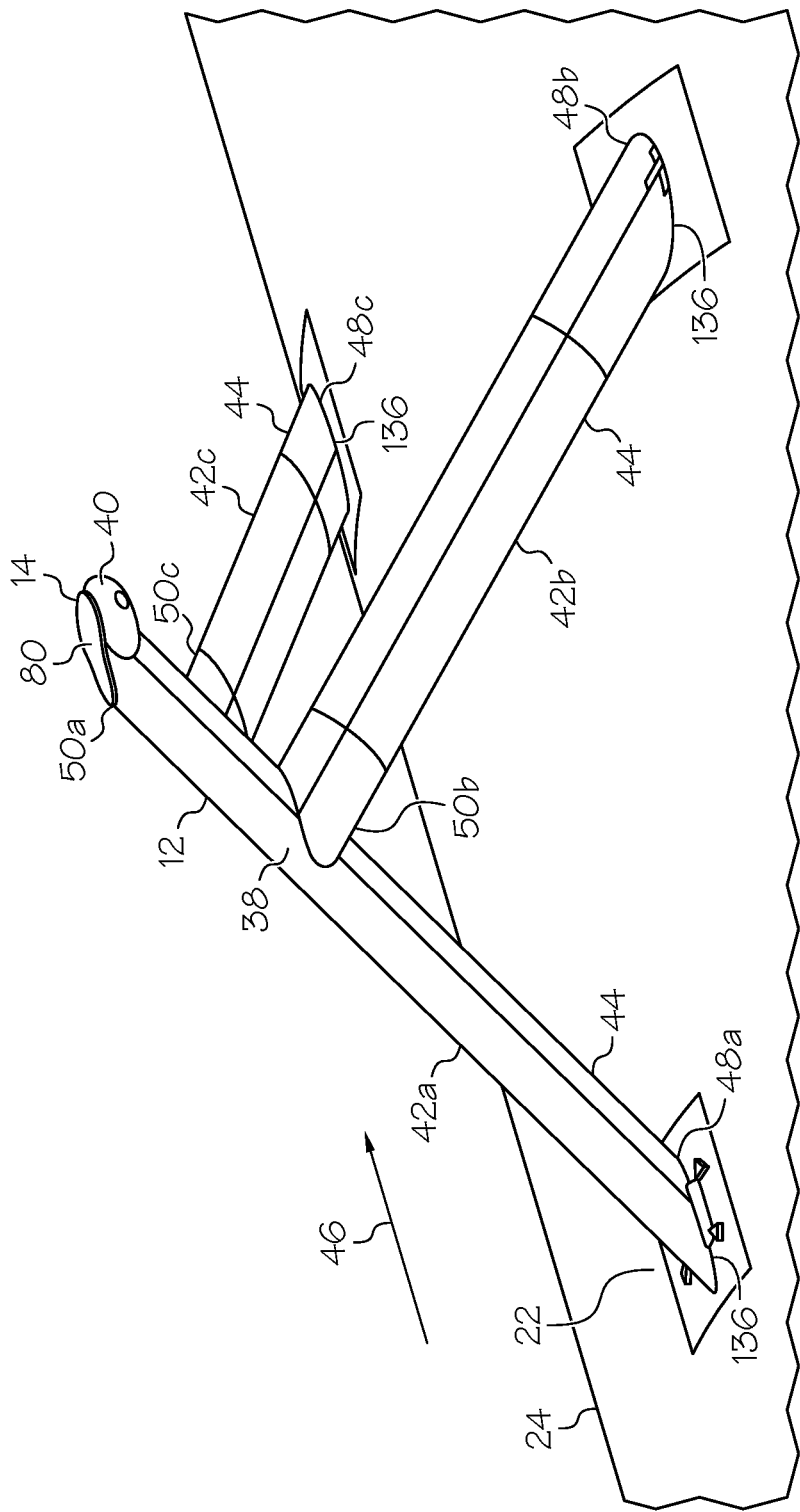
FIG. 3 is a side perspective view of one embodiment of the tripod assembly and camera fairing of the disclosed apparatus.

Referring to FIG. 3, the tripod assembly 12 may include aerodynamic surface 38 and the camera fairing 14 may include aerodynamic surface 40. The aerodynamic surfaces 38, 40 may be suitably shaped to control and/or reduce vibrations upon the camera 18 and preserve image quality obtained by the camera 18 (FIG. 1) when monitoring the component 20 (FIG. 2) during operation of the vehicle 24 (e.g., during flight).

The tripod assembly 12 may include a tripod 52 including three legs 42 (identified individually as a first leg 42a, a second leg 42b and a third leg 42c). For example, the first leg 42a may define a forward leg (e.g., being directed toward a forward end of the vehicle 24) and the second leg 42b and third leg 42c may define a pair of aft legs (e.g., being directed toward an aft end of the vehicle 24. As used herein, the terms forward and aft may be considered relative to a direction of movement of the vehicle 24 (e.g., the aircraft 32).

Each leg 42 may include a lower end 48 (identified individually as lower ends 48a, 48b and 48c) and an upper end 50 (identified individually as upper ends 50a, 50b and 50c) longitudinally opposed from the lower end 48. The lower end 48 of each leg 42 may be connected to the vehicle 24. For example, the lower end 48 (e.g., lower ends 48a, 48b and 48c) of each leg 42 (e.g., the first leg 42a, the second leg 42b and the third leg 42c) may include and/or terminate at a lower attach point 136 connected to the exterior surface 22 of the vehicle 24.

The first leg 42a may be aligned with (e.g., directed into) a streamline direction 46 of the vehicle 24. As used herein, the streamline direction 46 may be substantially opposite a direction of travel of the vehicle 24. The second leg 42b and the third leg 42c may extend from the first leg 42a. For example, the upper ends 50b, 50c of the second leg 42b and the third leg 42c, respectively, may be connected to the first leg 42a between the lower end 48a and the upper end 50a.

The second leg 42b and the third leg 42c may be offset or staggered along a longitudinal axis of the first leg 42a. For example, the third leg 42c may be positioned above the second leg 42b. As an example, the second leg 42b may be positioned proximate (e.g., at or near) the middle of the first leg 42a and the third leg 42c may be positioned proximate the upper end 50a of the first leg 42a.

Those skilled in the art will recognize that the position of the second leg 42b and the third leg 42c on the first leg 42a may depend on the dimensions (e.g., length dimension) of the first leg 42a. As a general, non-limiting example, the second leg 42b may be connected to the first leg 42a at a position approximately ⅔ of the length dimension from the lower end 48a and the third leg 42c may be connected to the first leg 42a at a position approximately ⅚ of the length dimension from the lower end 48a. As a specific, non-limiting example, the first leg 42a may include a length dimension of approximately 6 feet, the second leg 42b may be connected to the first leg 42a at a position approximately 4 feet from the lower end 48a and the third leg 42c may be connected to the first leg 42a at a position approximately 5 feet from the lower end 48a.

Figure 4:
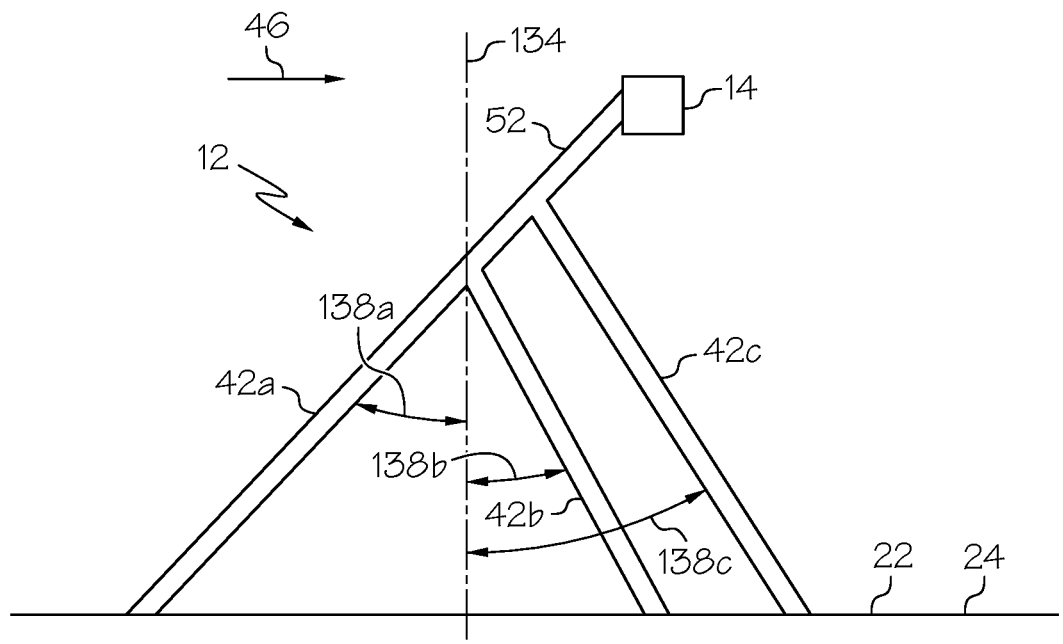
FIG. 4 is a schematic side view of one embodiment of the tripod of the tripod assembly with respect to a reference plane normal to a streamline direction.

Referring to FIG. 4, each leg 42 (e.g., the first leg 42a, the second leg 42b and the third leg 42c) may be disposed at a non-zero sweep angle 138 (identified individually as a first sweep angle 138a, a second sweep angle 138b and a third sweep angle 138c) with respect to a reference plane 134 normal to the streamline direction 46. For example, the sweep angles 138 may be approximately between 40 degrees and 60 degrees. As another example, the sweep angles 138 may be approximately between 45 degrees and 55 degrees. As a specific, non-limiting example, the first sweep angle 138a may be approximately 51.3 degrees and the second sweep angle 138b and third sweep angle 138c may be approximately 45.2 degrees.

The offset position of the second leg 42b and the third leg 42c with respect to the first leg 42a and the sweep angles 138 of each leg 42 may be configured to substantially reduce and/or eliminate transonic interactions with the tripod 12. As used herein, transonic may refer to a condition of flight in which a range of velocities of airflow exist surrounding and/or flowing past the legs 42 that are concurrently below, at, and above the speed of sound in a local Mach number range between approximately 0.5 to 1.5. As used herein, local Mach number may refer to the speed of the airflow proximate (e.g., at or around) the legs 42. For example, the sweep angles 138 (e.g., each of the first sweep angle 138a, the second sweep angle 138b and the third sweep angle 138c) may depend upon and/or may be adjusted with respect to various factors including, but not limited to, the local Mach number and the thickness of the leg 42 (e.g., a cross-sectional thickness of each leg 42 along a Y-axis, as described herein below and illustrated in FIG. 7).

Figure 5:
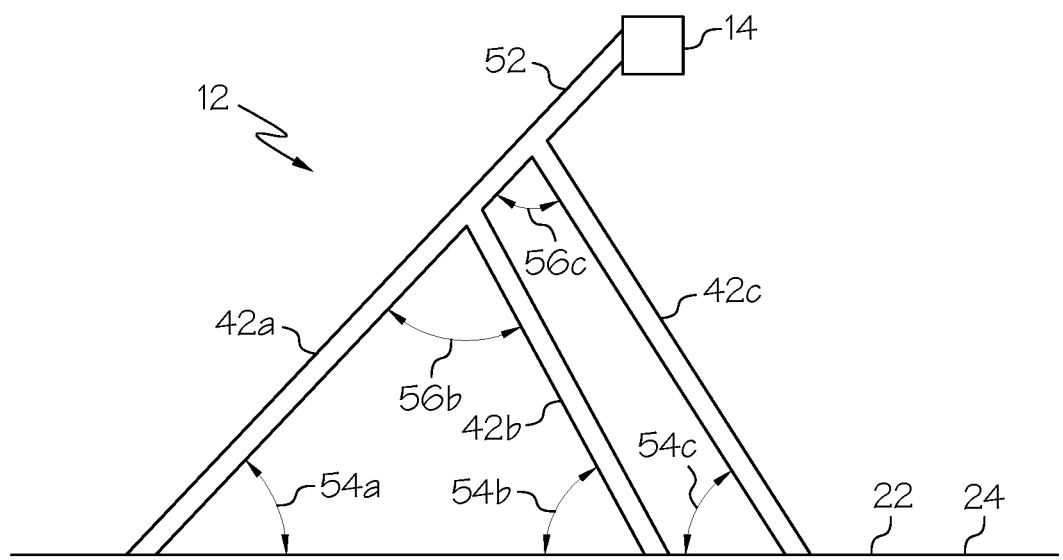
FIG. 5 is a schematic side view of one embodiment of the tripod of the tripod assembly with respect to an exterior surface of the vehicle.

Referring to FIG. 5, each leg 42 may be connected to the vehicle 24 at a non-zero lower connection angle 54 with respect to the exterior surface 22 (identified individually as a first lower connection angle 54a, a second lower connection angle 54b and a third lower connection angle 54c). The second leg 42b and the third leg 42c may be connected to the first leg 42a at a non-zero upper connection angle 56 with respect to the first leg 42a (identified individually as a second upper connection angle 56a and a third upper connection angle 56c). Those skilled in the art will recognize that the lower connection angle 54 and/or the upper connection angles 56 may depend upon the sweep angles 138.

Figure 6:
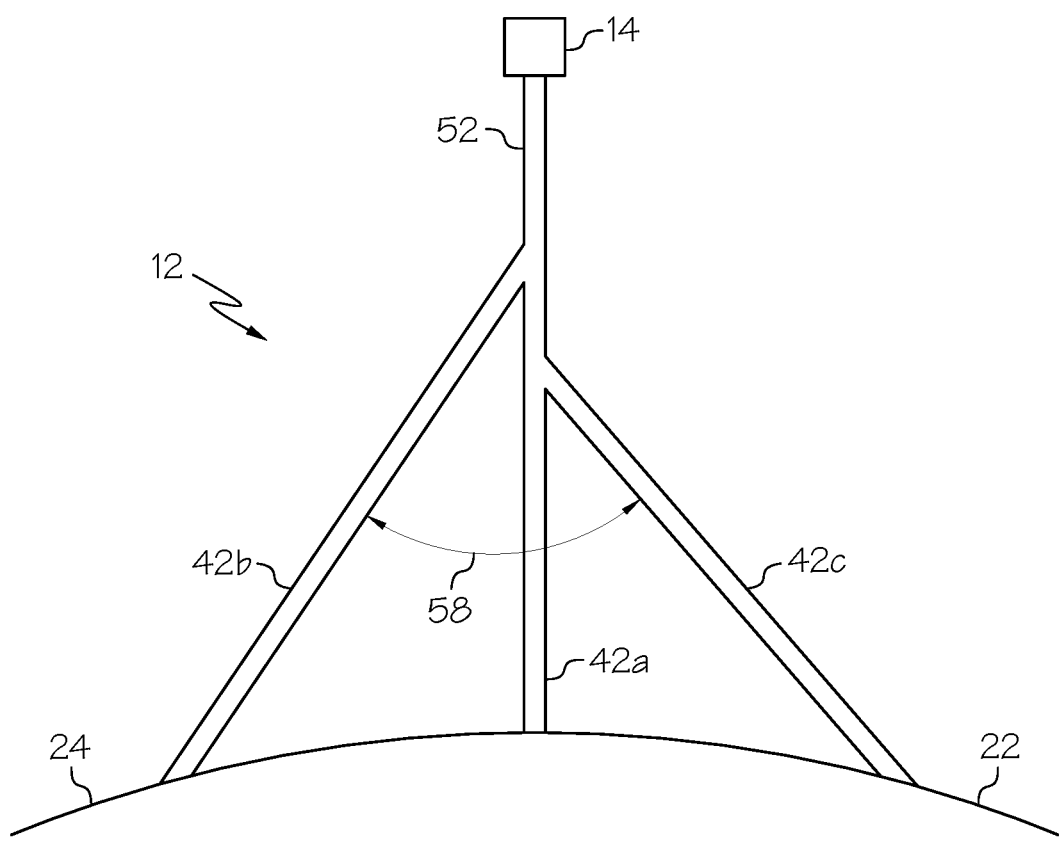
FIG. 6 is a schematic rear view of the tripod.

Referring to FIG. 6, the second leg 42b and the third leg 42c may be disposed at a non-zero splay angle 58 with respect to one another. The splay angle 58 may depend upon the local Mach number. For example, the splay angle 58 between the second leg 42b and the third leg 42c may be set for a minimum Mach number (e.g., below 1) in order to minimize supersonic flow and avoid a wake resulting from airflow passing over the first leg 42a. For example, the splay angle 58 may be between approximately 40 degrees and 65 degrees. As another example, the splay angle 58 may be approximately 60.6 degrees.

Figure 7:
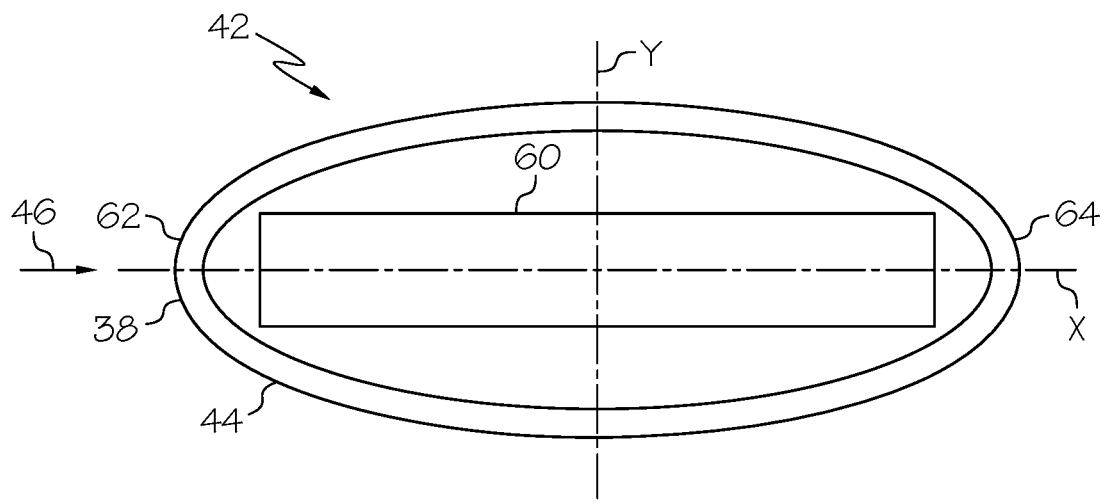
FIG. 7 is a schematic view, in section, of one embodiment of the leg of the tripod.

Referring to FIG. 7, in one example construction, the tripod assembly 12 may include an airfoil 44 surrounding internal support struts 60 defining each leg 42 of a tripod 52. For example, each leg 42 may include the support strut 60 and the airfoil 44 connected to and substantially surrounding the support strut 60. The airfoil 44 may define the aerodynamic surface 38 of the tripod assembly 12 (e.g., of each leg 42). In one example construction, the aerodynamic surface 38 may be smooth. In another example construction, the aerodynamic surface 38 may include surface roughness and/or vortex generators.

The airfoil 44 of each leg 42 may include an X-axis and a Y-axis. The airfoil 44 of each leg 42 may be oriented such that the X-axis is substantially parallel to the streamline direction 46. For example, the airfoil 44 of each leg 42 may be oriented such that a leading edge 62 of the airfoil 44 is aligned with and directed into the airflow. The airfoil 44 of each leg 42 may be symmetric about both the X-axis and the Y-axis. For example, the leading edge 62 and a trailing edge 64 of the airfoil 44 may be substantially the same (e.g., having substantially equal radius). The symmetric cross-sectional shape airfoil 44 may limit steady and unsteady aerodynamic side loads on the leg 42 (e.g., on the strut 60).

Figure 8:
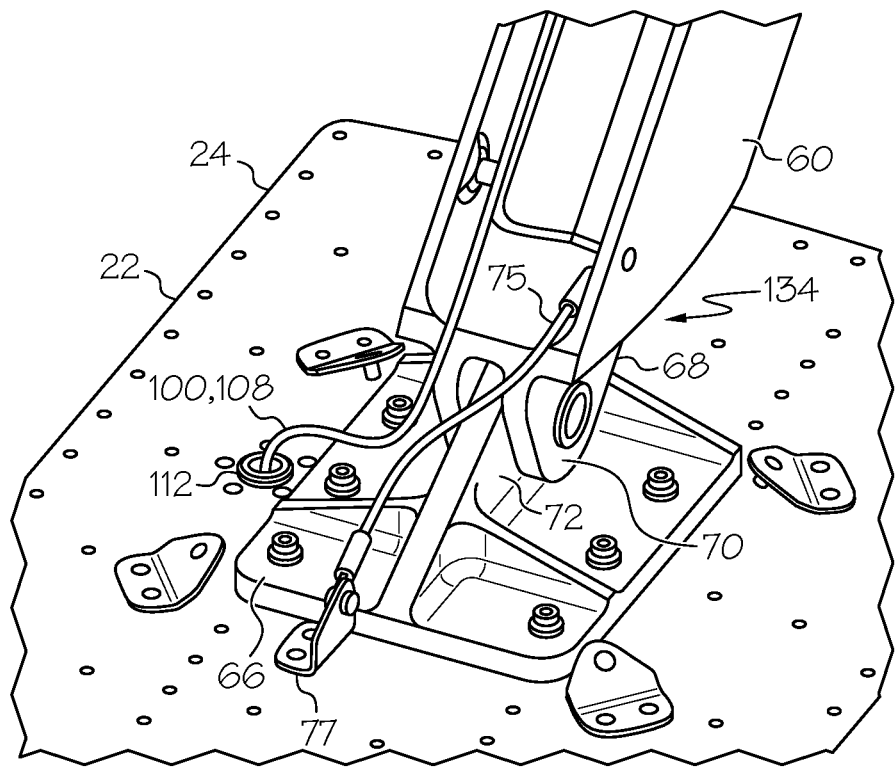
FIG. 8 is a partial front and side perspective view of one embodiment of the support strut and mount fitting of the tripod assembly.

Referring to FIG. 8, the support strut 60 may be connected to the vehicle 24 (e.g., at the lower end 48 of the leg 42). A lower end 68 of the support strut 60 may be connected to the vehicle 24 in a non-rigid manner. The non-rigid connection between the strut 60 and the exterior surface 22 of the vehicle 24 (e.g., at the lower attach point 136) may provide for minor movement of the strut 60 with respect to the exterior surface 22 of the vehicle 24. Such minor movement of the strut 60 may allow for minor position adjustments of the legs 42 with respect to the exterior surface 22 of the vehicle 24 (e.g., the lower connection angles 54), such as in response to flexing of the exterior surface 22 of the vehicle 24 (e.g., during flight of the aircraft 32).

For example, the support strut 60 may be pivotally connected (e.g., via a pinned connection) to the vehicle 24 at the lower attach point 136. In an example construction, the lower attach point 136 may include a mount fitting 66 connected to the exterior surface 22 of the vehicle 24. The mount fitting 66 may include a tang 72. The lower end 68 of the support strut 60 may include a clevis 70. The tang 72 may be received within a U-shaped portion of the clevis 70 and secured by a pin.

The tripod assembly 12 may be grounded to the vehicle 24. For example, the tripod assembly 12 may include a jumper cable 75 electrically connected between the support strut 60 and a grounding bracket 77. The grounding bracket 77 may be connected to the exterior surface 22 of the vehicle 24. The jumper cable 75 and the grounding bracket 77 may minimize or eliminate electromagnetic effects on the tripod assembly 12.

Figure 9:
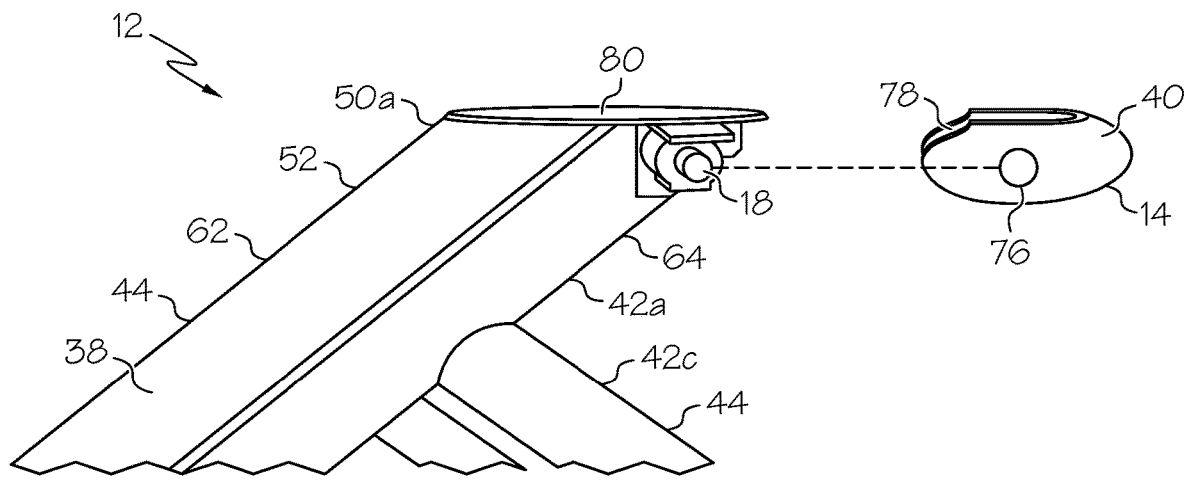
FIG. 9 is a partial side elevational view of the tripod and the camera fairing of the disclosed apparatus.

Referring to FIG. 9, in one embodiment, the camera 18 may be connected to the upper end 50a of the first leg 42a. The camera fairing 14 may be connected to the first leg 42a surrounding the camera 18. For example, the camera 18 and the camera fairing 14 may be connected about the trailing edge 64 of the airfoil 44 of the first leg 42a. In an example construction, the camera fairing 14 may include an opening 78 suitably sized to receive a portion of the airfoil 44 (e.g., a portion of the trailing edge 64) of the first leg 42a. The camera fairing 14 may include an aperture 76. The aperture 76 may be aligned with a lens of the camera 18 upon the camera fairing 14 being connected to the first leg 42 of the tripod 52, as further illustrated in FIG. 12.

The tripod 52 may include a head plate 80. The head plate 80 may cover the upper end of the airfoil 44 and an upper portion of the opening 78 in the camera fairing 14, as also illustrated in FIG. 4. The head plate 80 may provide an aerodynamic interface between the aerodynamic surface 38 of the tripod 52 and the aerodynamic surface 40 of the camera fairing 14.

Figure 10:
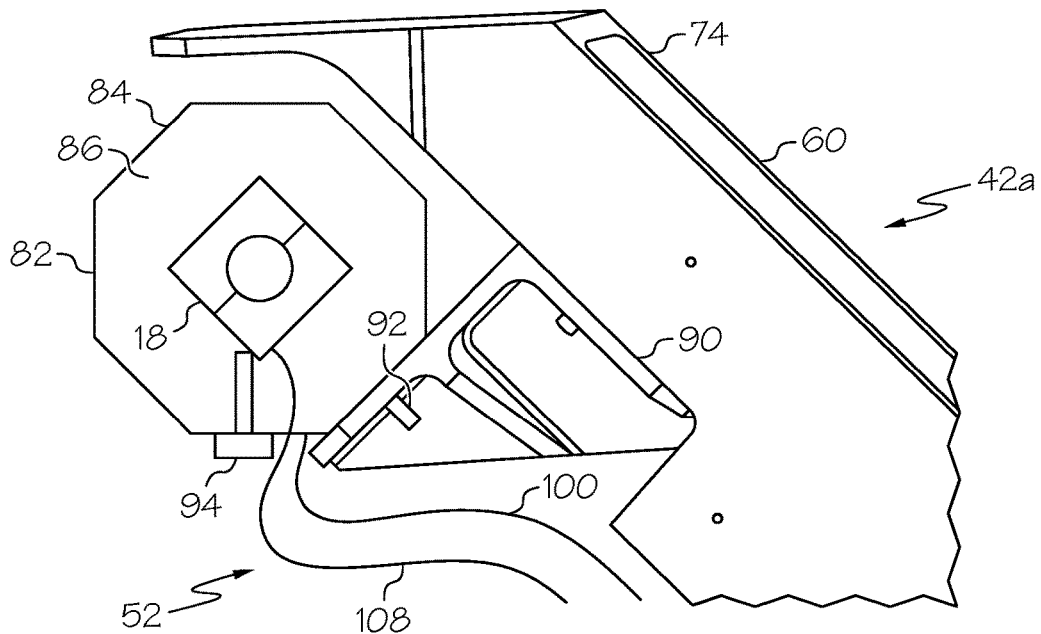
FIG. 10 is a partial side elevational view of the camera enclosure and camera of the disclosed apparatus.

Referring to FIG. 10, in one embodiment, the imaging system 16 may include a camera enclosure 82. The camera 18 may be mounted within the camera enclosure 82. In an example construction, the camera enclosure 82 may include a plurality of sidewalls 84 defining a sealed internal volume 86. The camera 18 may be housed within the sealed internal volume 86 of the camera enclosure 82. The camera enclosure 82 may include an adjustment mechanism 94 interconnected with the camera 18. The adjustment mechanism 94 may allow for rotational and/or angular position adjustment (e.g., with respect to the X-Y plane of the body coordinate system 132) of the camera 18 within the camera enclosure 82 to optimally position the line of sight 26 of the camera 18 at a desired viewing angle 28 (FIG. 2).

In an example construction, the camera enclosure 82 may be connected to an upper end 74 of the support strut 60 of the first leg 42a. For example, the tripod 52 may include a mounting bracket 90 connected to the upper end 74 of the strut 60 of the first leg 42a. The camera enclosure 82 may be connected to the mounting bracket 90. An interface between the camera enclosure 82 and the mounting bracket 90 may include an adjustment fastener 92. The adjustment fastener 92 may allow for position adjustment of the camera enclosure 82, and thus, the camera 18, with respect to the tripod 52 (e.g., the strut 60).

Referring to FIGS. 1 and 10, a purge system 96 (FIG. 2) may be connected to the camera enclosure 82 to maintain environmental conditions within the sealed internal volume 86 of the camera enclosure 82 to ensure image quality obtained by the camera 18. For example, a dry nitrogen source 98 may be fluidly connected to the camera enclosure 82. Tubing 100 may fluidly interconnect the dry nitrogen source 98 and the camera enclosure 82. The purge system 96 may also include suitable valves 102 and/or connectors 104.

The imaging system 16 (FIG. 2) may include a computer 106 communicatively connected to the camera 18. The computer 106 may record and/or process images and/or video obtained by the camera 18. Electrical cable 108 may electrically interconnect the computer 106 and the camera 18. The electrical cable 108 may transfer power and/or data between the computer 106 and the camera 18. The electrical cable 108 may include braided wire shielding to reduce or eliminate electromagnetic effects on the imaging system 16 (e.g., the camera 18). The imaging system 16 may also include suitable connectors 110.

Referring to FIGS. 1 and 8, in an example implementation, the dry nitrogen source 98, the computer 106 and a suitable power supply (not shown) may be located within an interior of the vehicle 24 (e.g., within the aircraft 32). The tubing 100 and the electrical cable 108 may extend through the exterior surface 22 of the vehicle 24 for connection to the camera enclosure 82 and the camera 18, respectively. A grommet 112 may be used to seal a through hole formed through the exterior surface 22 through which the tubing 100 and the electrical cable 108 extend. The tubing 100 and the electrical cable 108 may pass through the grommet 112 connected to the exterior surface 22.

Figure 11:
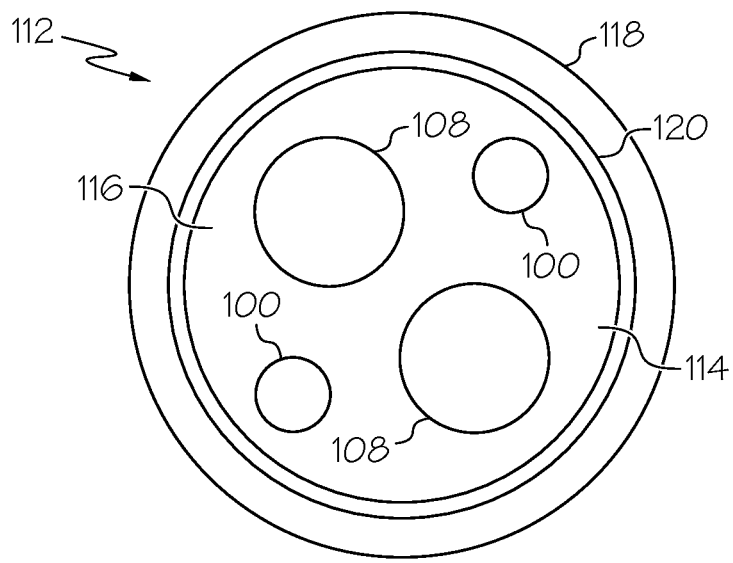
FIG. 11 is schematic view of a seal grommet of the disclosed apparatus 10.

Referring to FIG. 11, in an example construction, the grommet 112 may be suitably sized to receive two lines of tubing 100 (e.g., a primary tubing and a spare tubing) and two lines of electrical cable 108 (e.g., a primary electrical cable and a spare electrical cable). Any gaps 114 between the tubing 100, the electrical cable 108 and the grommet 112 may be filled with a sealant 116. The grommet 112 may include an outer ring 118 and a layer of over braid shielding to reduce or eliminate electromagnetic effects.

Figure 12:
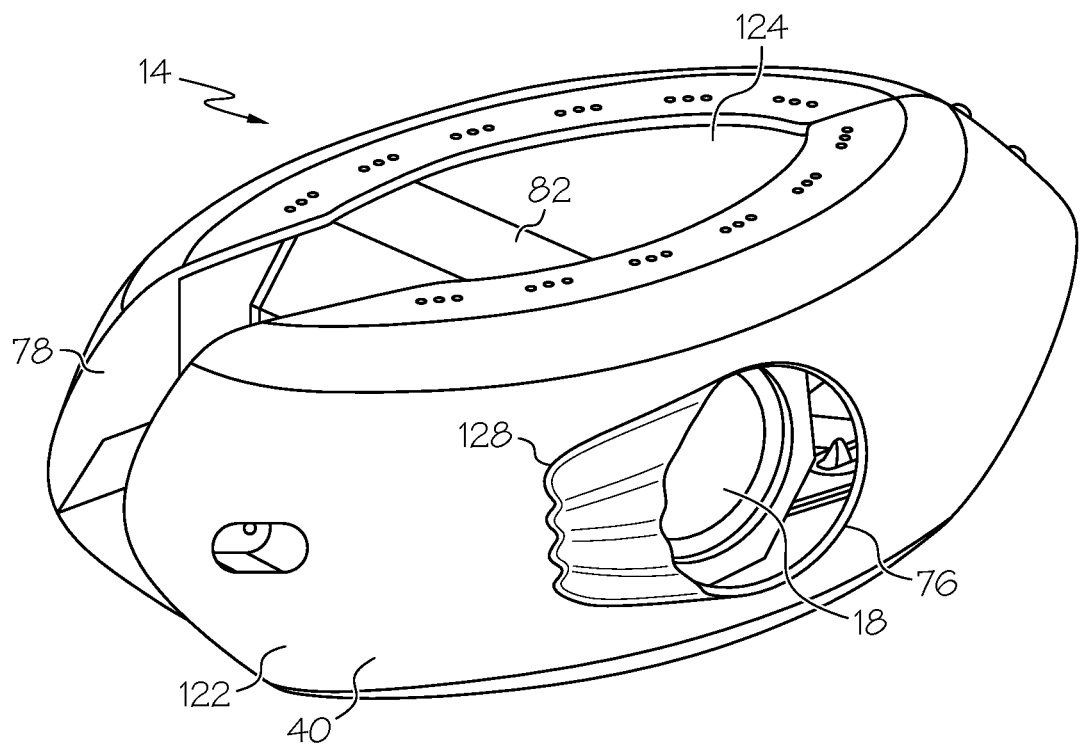
FIG. 12 is a front and side perspective view of one embodiment of the camera fairing.
Figure 13:
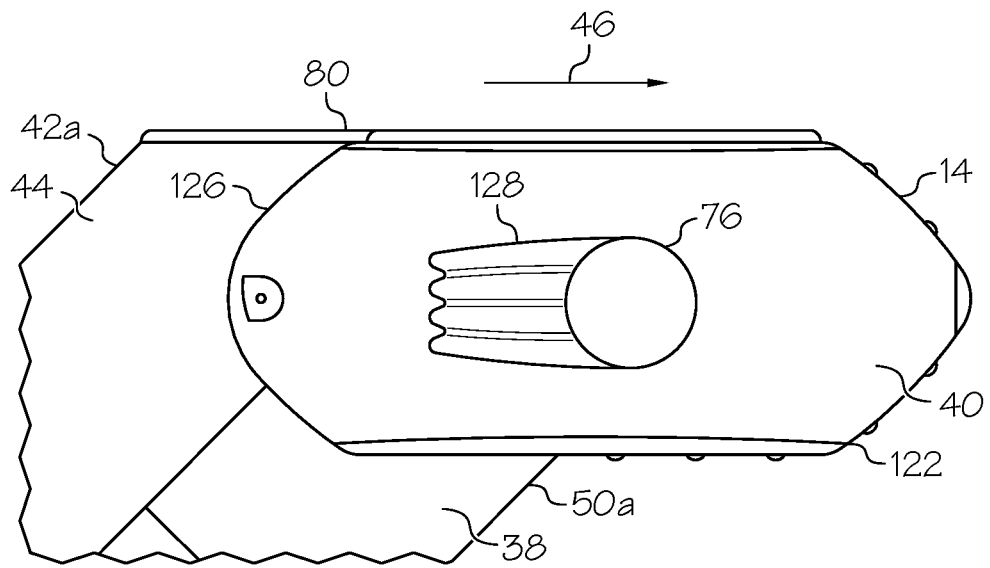
FIG. 13 is a partial side elevational view of the camera fairing.
Figure 14:
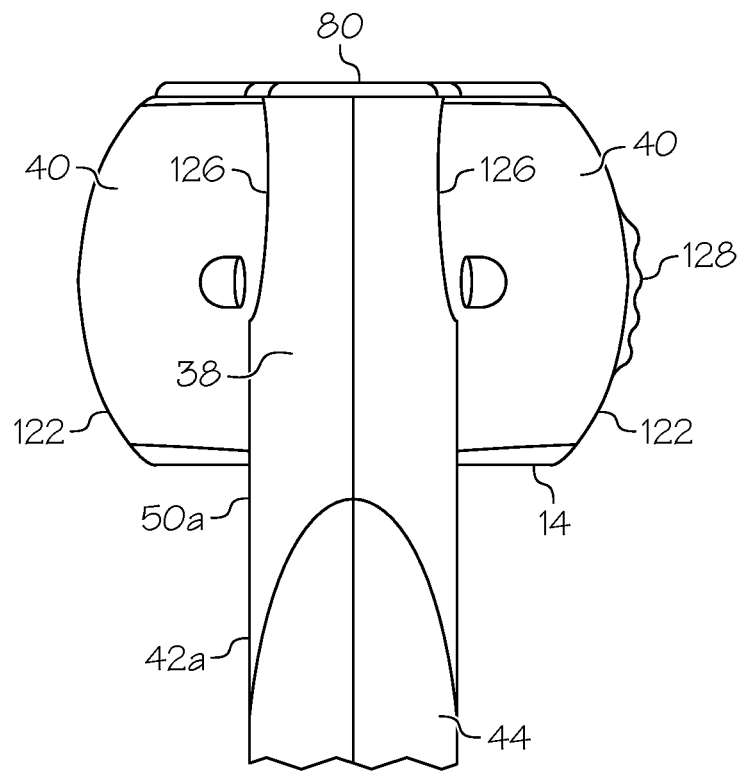
FIG. 14 is a partial front elevational view of the camera fairing.

Referring to FIGS. 12-14, the camera fairing 14 may include a sidewall 122 defining an internal volume 124. The sidewall 122 may include a curved cross-sectional profile defining the aerodynamic surface 40 of the camera fairing 14. The aerodynamic surface 40 may be substantially smooth. The camera 18 or the camera enclosure 82 and the camera 18 may be positioned within the internal volume 124, as illustrated in FIG. 12, upon the camera fairing 14 being connected to the first leg 42a (e.g., the airfoil 44) of the tripod 52, as illustrated in FIGS. 13 and 14.

The opening 78 (FIG. 12) may be sized in close tolerance to a thickness dimension of the airfoil 44 of the first leg 42a (FIGS. 12 and 13). Any interfaces 126 (FIGS. 13 and 14) between the edges of the opening 78 of the camera fairing 14 and the surface of the airfoil 44 may be substantially closed to provide an aerodynamic interface between the aerodynamic surface 38 of the airfoil 44 and the aerodynamic surface 40 of the camera fairing 14. In an example construction, a sealing strip (e.g., speed tape) may be used to further cover and seal the interfaces 126.

The camera fairing 14 may include a plurality of protrusions 128 extending or projecting outwardly from the sidewall 122. The protrusions 128 may control the airflow passing over and/or into the aperture 76 to reduce noise (e.g., whistling and/or buzzing), vibrations, pressure variations or any other undesired signal that may negatively impact optimal image quality obtained by the camera 18 during monitoring of the vehicle 24. The protrusions 128 may be positioned proximate (e.g., at or near) the aperture 76. For example, the protrusions 128 may be positioned at least partially around the aperture 76 disposed through the sidewall 122. The protrusions 128 may be aligned with streamline direction 46 (e.g., the direction of airflow). For example, a length dimension (e.g., length l, illustrated in FIG. 16) may be parallel with the streamline direction 46.

Figure 15:
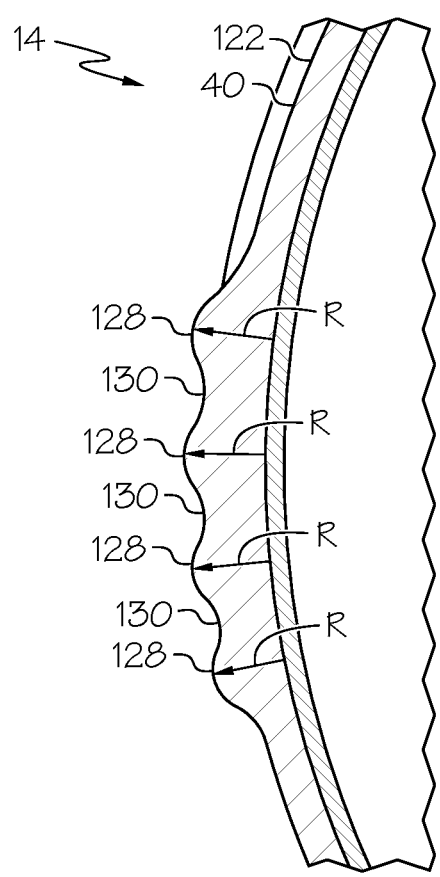
FIG. 15 is a partial schematic illustration, in section, of one embodiment of the plurality of protrusions of the camera fairing.

Referring to FIG. 15, each protrusion 128 may include a curved cross-sectional profile (e.g., convex-shaped) having a radius R. An inter-region 130 of the aerodynamic surface 40 (e.g., an exterior surface of the sidewall 122) between adjacent (e.g., side-by-side) protrusions 128 may include a curved cross-sectional profile (e.g., concave-shaped) opposite to the curved cross-sectional profile of the protrusions 128. Thus, the plurality of protrusions 128 may form a wavy pattern (e.g., having a waveform) on the aerodynamic surface 40.

The radius R of each protrusion 128 may be between approximately 0.12 inch and 0.50, and more particularly, between approximately 0.20 inch and 0.24 inch. In an example construction, the radius R of each protrusion 128 may be the same. In another example construction, the radius R of one or more protrusions 128 may be different than at least one other protrusion 128. For example, an uppermost protrusion 128 may include the largest radius R and each successive protrusion 128 may include a radius R equal to or smaller than the radius R of the protrusion 128 directly above. As another example, a lowermost protrusion 128 may include the largest radius R and each successive protrusion 128 may include a radius R equal to or smaller than the radius R of the protrusion 128 directly below. As another example, the radius R each protrusion 128 may be different. As yet another example, the radius R of each protrusion 128 may be randomized.

Figure 16:
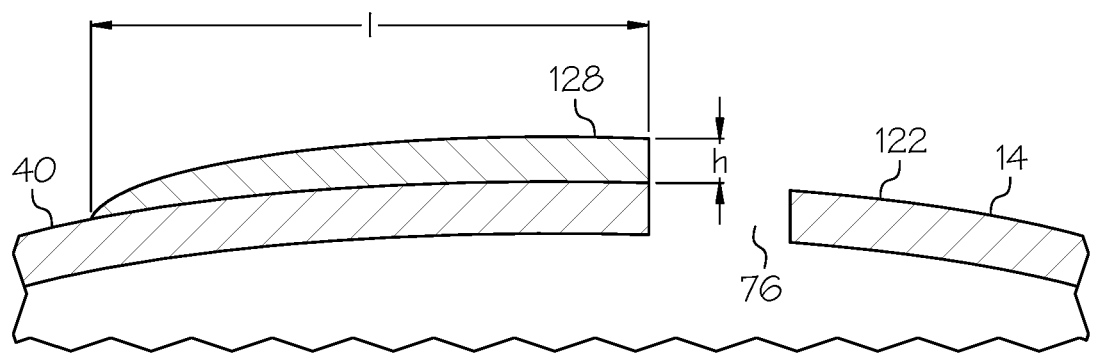
FIG. 16 is a partial side view of the protrusion.

Referring to FIG. 16, each protrusion 128 may gradually increase in height h as the protrusion approaches the aperture 76. The height h may be between approximately 0.08 inch and 0.22 inch. In an example construction, the height h of each protrusion 128 may be the same. In another example construction, the height h of one or more protrusions 128 may be different than at least one other protrusion 128. In yet another example construction, the height h of each protrusion 128 may be different.

Each protrusion 128 may include a length 1 as the protrusion approaches the aperture 76. The length 1 may be between approximately 2 inches and 3 inches. In an example construction, the length 1 of each protrusion 128 may be the same. In another example construction, the length 1 of one or more protrusions 128 may be different than at least one other protrusion 128. In yet another example construction, the length 1 of each protraction 128 may be different.

Accordingly, the disclosed apparatus may provide a tripod with an aerodynamic surface that positions a viewing angle of a camera to a near-optimum data collection position and controls detrimental airflow on the tripod to minimize vibrations on the camera to reduce negative impact on image quality. A camera fairing with an aerodynamic surface may surround the camera to reduce vibrations, pressure variations or any other undesirable signal to optimize image quality. In the aerospace example, the apparatus may be attached in a manner suitable to achieve system safety requirements and permit removal and/or re-installation of the tripod and/or the camera.

Figure 17:
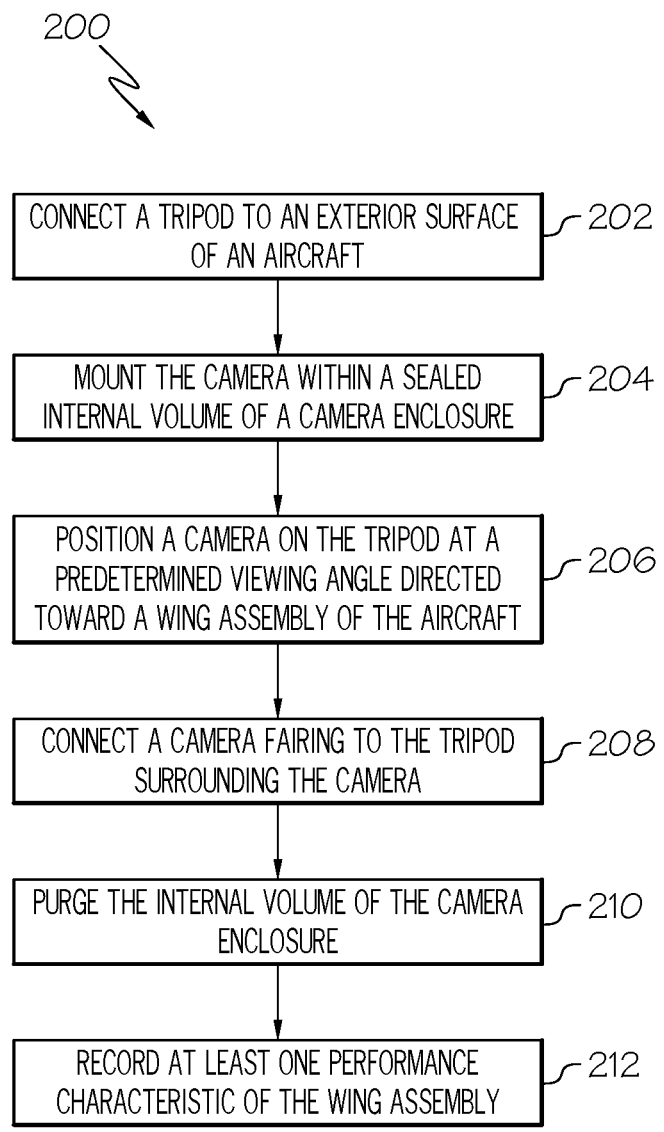
FIG. 17 is a flow diagram of one embodiment of the disclosed method for monitoring at least one performance characteristic of a wing assembly of an aircraft.

Referring to FIG. 17, one embodiment of a method, generally designated 200, for monitoring at least one performance characteristic of a wing assembly of an aircraft may begin with the step of connecting a tripod to an exterior surface of the aircraft, as shown at block 202. The tripod may include a plurality of airfoils defining an aerodynamic surface of the tripod.

As shown at block 204, the camera may be mounted within a sealed internal volume of a camera enclosure and the camera enclosure may be connected to the tripod.

As shown at block 206, a camera may be positioned on the tripod at a predetermined non-zero viewing angle directed toward the wing assembly.

As shown at block 208, a camera fairing may be connected to the tripod surrounding the camera and/or the camera and camera enclosure combination. The camera fairing may include a sidewall defining an aerodynamic surface of the camera fairing, an aperture disposed through the sidewall and aligned with the camera and a plurality of protrusions positioned proximate (e.g., at or near) the aperture.

As shown at block 210, the sealed internal volume of the camera enclosure may be purged, for example by a dry nitrogen source.

As shown at block 212, at least one performance characteristic of the wing assembly may be recorded during flight of the aircraft.

Although various embodiments of the disclosed apparatus have been shown and described, modifications may occur to those skilled in the art upon reading the specification. The present application includes such modifications and is limited only by the scope of the claims.

What is claimed is:

1. An apparatus for monitoring at least one performance characteristic of a component of a vehicle, said apparatus comprising:
    a tripod comprising an aerodynamic surface, said tripod further comprising:
        a first leg directed toward a forward end of said vehicle;
        a second leg directed toward an aft end of the vehicle; and
        a third leg directed toward said aft end of said vehicle, wherein:
    each of said first leg, said second leg and said third leg comprises an airfoil;
    said airfoil of each of said first leg, said second leg and said third leg defines said aerodynamic surface of said tripod;
        each of said first leg, said second leg and said third leg are disposed at a non-zero sweep angle with respect to a plane normal to a streamline direction;
        said third leg is offset with respect to said second leg; and
        said second leg and said third leg are disposed at a non-zero splay angle with respect to one another.

2. The apparatus of claim 1 further comprising a camera positioned on an upper end of said first leg at a viewing angle.

3. The apparatus of claim 2 further comprising a camera fairing connected to said first leg and surrounding said camera.

4. The apparatus of claim 3 wherein said camera fairing comprises:
    a sidewall comprising an aerodynamic surface; and
    an aperture disposed through said sidewall, wherein said aperture is aligned with said camera.

5. The apparatus of claim 4 wherein said aerodynamic surface of said camera fairing comprises a plurality of protrusions positioned proximate said aperture.

6. The apparatus of claim 5 wherein each protrusion of said plurality of protrusions adjoins an adjacent one of said plurality of protrusions.

7. The apparatus of claim 1 wherein said airfoil comprises a leading edge and a trailing edge, and
    wherein said leading edge of said airfoil of each of said first leg, said second leg and said third leg is oriented in said streamline direction.

8. The apparatus of claim 1 further comprising a camera enclosure connected to said first leg, said camera enclosure comprising a plurality of sidewalls defining a sealed internal volume,
    wherein said camera is mounted within said sealed internal volume of said camera enclosure, and
    wherein said camera fairing is connected to said first leg surrounding said camera enclosure.

9. The apparatus of claim 8 further comprising a dry nitrogen source fluidly connected to said internal volume of said camera enclosure.

10. The apparatus of claim 8 wherein:
    each of said first leg, said second leg and said third leg further comprises a support strut mounted within said airfoil;
    said camera enclosure is connected to an upper end of said strut of said first leg; and
    said camera fairing is connected to an upper end of said airfoil of said first leg surrounding said camera enclosure.

11. The apparatus of claim 1 wherein:
    said vehicle comprises an aircraft and said component comprises a wing assembly of said aircraft;
    each of said first leg, said second leg, and said third leg is non-rigidly connected to an exterior surface of said aircraft; and
    said camera is positioned at a predetermined viewing angle directed toward said wing assembly.

12. The apparatus of claim 1, wherein said airfoil of each of said first leg, said second leg and said third leg has a symmetric cross-sectional shape.

13. A method for monitoring at least one performance characteristic of a wing assembly of an aircraft, said method comprising:
- connecting a tripod to an exterior surface of said aircraft, said tripod comprising a plurality of airfoils defining an aerodynamic surface of said tripod;
- positioning a camera on said tripod at a predetermined viewing angle directed toward said wing assembly;
- connecting a camera fairing to said tripod surrounding said camera, said camera fairing comprising a sidewall defining an aerodynamic surface of said camera fairing, an aperture disposed through said sidewall and aligned with said camera and a plurality of protrusions positioned proximate said aperture; and
- recording said at least one performance characteristic of said wing assembly during flight.

14. The method of claim 13 wherein said tripod further comprises:
- a first leg directed toward a forward end of said aircraft;
- a second leg directed toward an aft end of said aircraft; and
- a third leg directed toward said aft end of said aircraft.

15. The method of claim 14 wherein each of said first leg, said second leg and said third leg are disposed at a non-zero sweep angle with respect to a plane normal to a streamline direction.

16. The method of claim 15 wherein said third leg is offset with respect to said second leg.

17. The method of claim 16 wherein said second leg and said third leg are disposed at a non-zero splay angle with respect to one another.

18. The method of claim 13 wherein each protrusion of said plurality of protrusions adjoins an adjacent one of said plurality of protrusions.

19. The method of claim 13 further comprising:
- mounting said camera within a sealed internal volume of a camera enclosure;
- connecting said camera enclosure to said tripod; and
- purging said sealed internal volume of said camera enclosure.

20. The method of claim 19 wherein said purging comprises supplying dry nitrogen to said sealed internal volume.

* * * * *